United States Patent
Reyes et al.

(10) Patent No.: US 11,970,144 B2
(45) Date of Patent: Apr. 30, 2024

(54) OUTRIGGER FOOTPAD RETAINER SYSTEM AND METHOD OF USE

(71) Applicant: Bil-Jax, Inc., Archbold, OH (US)

(72) Inventors: Robert Warren Reyes, Maumee, OH (US); Keith Raymond Bruner, Wauseon, OH (US); Michael John Docis, Holland, OH (US)

(73) Assignee: Bil-Jax, Inc., Archbold, OH (US)

( * ) Notice: Subject to any disclaimer, the term of this patent is extended or adjusted under 35 U.S.C. 154(b) by 589 days.

(21) Appl. No.: 17/172,287

(22) Filed: Feb. 10, 2021

(65) Prior Publication Data

US 2021/0261100 A1   Aug. 26, 2021

Related U.S. Application Data

(60) Provisional application No. 62/979,036, filed on Feb. 20, 2020.

(51) Int. Cl.
| | |
|---|---|
| *B60S 9/04* | (2006.01) |
| *B60S 9/10* | (2006.01) |
| *B66C 23/78* | (2006.01) |
| *B66C 23/88* | (2006.01) |
| *E02F 9/08* | (2006.01) |
| *F16C 11/06* | (2006.01) |

(52) U.S. Cl.
CPC . *B60S 9/04* (2013.01); *B60S 9/10* (2013.01); *B66C 23/78* (2013.01); *B66C 23/88* (2013.01); *E02F 9/085* (2013.01); *F16C 11/0695* (2013.01); *Y10T 403/32852* (2015.01)

(58) Field of Classification Search
CPC ...... B60S 9/04; B60S 9/10; B60S 9/12; B66C 23/78; B66C 23/88; E02F 9/085; F16C 11/0695; F16C 11/0604; F16C 11/069; Y10T 403/32852; A47B 2097/008; A47B 891/08; A47B 91/16
USPC .... 248/430, 181.1, 181.2, 288.31, 663, 481, 248/499, 500, 501, 505, 510
See application file for complete search history.

(56) References Cited

U.S. PATENT DOCUMENTS

| | | | | |
|---|---|---|---|---|
| 1,762,545 | A | * | 6/1930 | Carpenter .......... A47G 25/0664 248/165 |
| 3,831,774 | A | | 8/1974 | Moore |
| 3,930,668 | A | | 6/1976 | Schuermann et al. |
| 4,266,809 | A | | 5/1981 | Wuerflein |
| 4,406,437 | A | * | 9/1983 | Wright .................. F16M 11/22 248/188.7 |
| 4,712,758 | A | * | 12/1987 | Cuschera ............... F16M 11/42 248/188.7 |
| 5,236,167 | A | * | 8/1993 | Tai ........................ F16M 11/20 248/188.7 |
| 9,347,600 | B2 | | 5/2016 | Lillienskjold |
| 9,550,475 | B1 | | 1/2017 | Walker et al. |

(Continued)

FOREIGN PATENT DOCUMENTS

EP    1598304 A2    11/2005

*Primary Examiner* — Bradley Duckworth
(74) *Attorney, Agent, or Firm* — Marshall & Melhorn, LLC

(57) ABSTRACT

One embodiment of an outrigger footpad retainer system is described and depicted. The system may include a spider assembly that has an upper unit and a lower unit. The upper unit may have a retainer portion and two legs extending from the portion. The lower unit may have a retainer portion and two legs extending from the portion. The upper portion may at least partially overlap the lower portion.

18 Claims, 4 Drawing Sheets

(56) References Cited

U.S. PATENT DOCUMENTS 10,266,158 B2  4/2019  Wilson et al.
2012/0091770 A1* 4/2012 Brooke ................. A47B 91/16
                                              248/188.5

* cited by examiner

OUTRIGGER FOOTPAD RETAINER SYSTEM AND METHOD OF USE

FIELD

A system for retaining footpads, such as for outriggers, and a method of use is described and depicted.

BACKGROUND

Outriggers may be used with many different types of vehicles, as well as for trailers (all of which will be called vehicles hereinafter). Typically, an outrigger comprises at least one arm that has one end attached to the vehicle and the other end selectively contacts the ground. When the outrigger is lowered and in contact with the ground, it provides additional support to the vehicle when the vehicle is stationary.

In most cases, the end of the outrigger arm that selectively contacts the ground is provided with a footpad. The prior art structure for attaching a footpad to the arm disadvantageously often uses many parts, which drives up manufacturing, assembly and maintenance costs; it also increases the complexity of the arm, which increases the number of failure modes.

In view of the disadvantages of the prior art, it would be advantageous for an outrigger to have a footpad retainer assembly that is simple and inexpensive but robust enough to operate in many conditions as well as easy to manufacture, assemble and maintain.

SUMMARY

In one aspect, an outrigger footpad retainer system may have a spider with an upper unit comprised of two legs connected to a first capture portion, and a lower unit comprised of two legs connected to a second capture portion. The upper unit may at least partially overlap the lower unit.

In another aspect, the first capture portion and the second capture portion may each have planar upper and lower surfaces defining a substantially constant thicknesses between the surfaces.

In another aspect, the first capture portion and the second capture portion may each have an aperture extending from the upper and lower surfaces through the capture portions, where the apertures may be vertically aligned with one another.

In another aspect, the first capture portion and the second capture portion may each have a radial channel extending from each aperture to an outer perimeter, where each radial channel may extend from the upper and lower surfaces through the capture portions.

In another aspect, each of the radial channels may have a width that is at least as wide as a width of a neck of a ball stud.

In another aspect, sides of each of the respective radial channels may be parallel one another.

In another aspect, a portion of the first capture portion may have a chamfered surface about the aperture.

In another aspect, the legs of each of the respective upper and lower units may be approximately 180 degrees from one another about the respective capture portions.

In another aspect, the legs of each of the respective upper and lower units may be angled downwardly from the respective capture portions.

In another aspect, the legs of the upper unit and the legs of the lower unit may be secured to a footpad base.

In another aspect, the capture portion of the lower unit may be located below the capture portion of the upper unit.

In another aspect, an upper surface of the second capture portion may be located directly below a lower surface of the first capture portion.

In another aspect, the radial channels may be offset and not aligned with one another so that capture portions of the upper and lower units close the respective apertures.

In another aspect, the legs of the upper and lower units may be spaced apart from one another about a footpad base by approximately 90 degrees.

In another aspect, the upper and lower units may be each one piece, integrally formed and unitary of a metallic material.

In another aspect, a ball stud may be located within the apertures of the first and second capture portions.

In another aspect, an outrigger footpad retainer system may have a spider with an upper unit comprised of two legs, where at least one leg may have a fastener flange at one end portion and a capture portion at an opposite end portion, a lower unit comprised of two legs, where at least one leg may have a fastener flange at one end portion and a capture portion at an opposite end portion. The capture portions may be in a first plane and substantially vertically aligned with one another, and the fastener flanges may be in a second plane below the first plane. Further, one of the capture portions of an upper or lower unit may have a channel aligned with one of the legs of the opposite unit.

In another aspect, the fastener flanges of the upper and lower units may be laterally offset from the capture portions.

BRIEF DESCRIPTION OF THE DRAWINGS

The advantages of the device and method described herein will become readily apparent to those skilled in the art from the following detailed description when considered in the light of the accompanying drawings in which.

DETAILED DESCRIPTION OF THE PREFERRED EMBODIMENTS

It is to be understood that the device and method described herein may assume various alternative orientations and step sequences, except where expressly specified to the contrary. It is also to be understood that the specific devices and processes illustrated in the attached drawings, and described in the following specification are simply exemplary embodiments. Hence, specific dimensions, directions or other physical characteristics relating to the embodiments disclosed are not to be considered as limiting, unless expressly stated otherwise.

Figure 1:
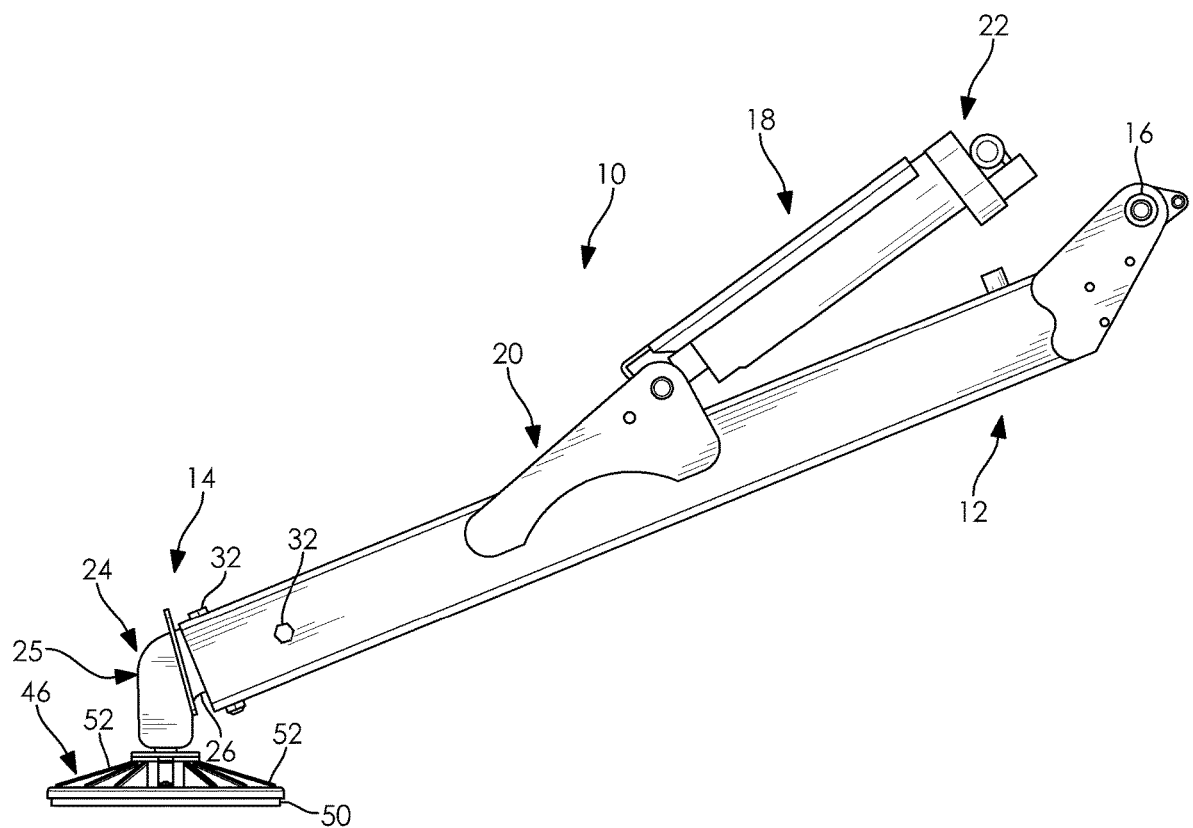
FIG. 1 depicts a side view one embodiment of an outrigger arm system.

Turning now to FIG. 1, one embodiment of an outrigger arm system 10 is depicted. The system 10 may be comprised of an attachment end portion 12 and a foot end portion 14. The attachment end portion 12 may have one or more joints 16 that pivotally connect the system 10 with a body or frame of a vehicle (not shown). This pivotal connection permits the outrigger arm system 10 to be moved with respect to the vehicle body or frame.

In most cases, the movement about the joint 16 is associated with a storage condition or a deployed condition of the system 10. By way of a non-limiting example, the joint 16 may be used to pivot the arm system 10 away from the body of the vehicle in the deployed condition and the joint 16 may also be used to pivot the arm system 10 toward the body of a vehicle in a storage condition. In most cases, the deployed condition may be an in-use condition and the storage condition may be for when the vehicle is underway or in a condition where the vehicle does not need the outrigger system deployed. The angle, type, rotation direction and number of the joints is not critical.

A biasing system 18 may be attached to the outrigger arm system 10. The biasing system 18 may be hydraulic, pneumatic, electric and/or spring powered. In the depicted embodiment, the biasing system 18 may be such as a hydraulic piston system. The biasing system 18 may have one end portion 20 connected to a portion of the outrigger arm system 10 and another end portion 22 attached to the vehicle and/or a different portion of the arm system 10.

The biasing system 18 may be used to selectively move the outrigger arm system 10. In one embodiment, the biasing system 18 may be used to selectively raise and/or lower the outrigger arm system 10 such as to and from the deployed condition. The biasing system 18 is not limited to raising/lowering, but can be used to retract and/or extend, and/or pivot the outrigger arm system 10.

Figure 2:
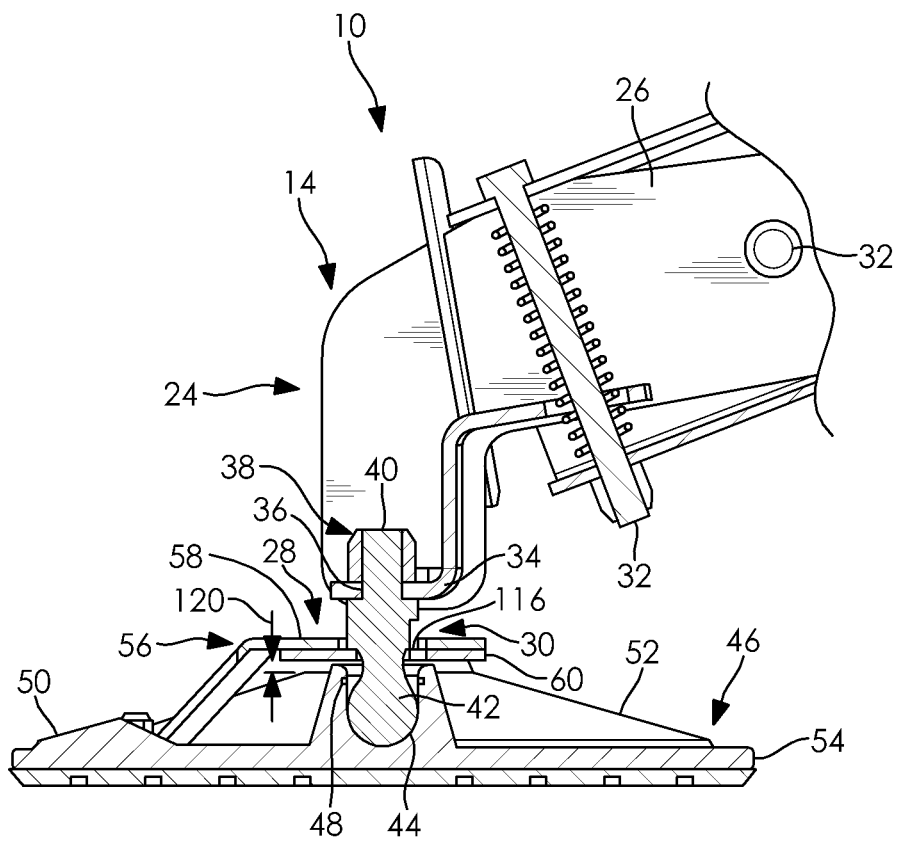
FIG. 2 depicts a cut-away side view of a portion of the system depicted in FIG. 1.

As seen in at least FIGS. 1 and 2, the foot end portion 14 of the outrigger arm system 10 may have a foot support 24. The foot support 24 may be part of an outrigger footpad retainer system 25. The foot support 24 may have a portion connected to the outrigger arm system 10 and a portion supporting part of a ball joint 30. More particularly, the foot support 24 may have an insert portion 26 that may be at least partially inserted into a hollow end portion of the outrigger arm system 10, as shown in FIG. 2. The insert portion 26 may be secured to the outrigger arm system 10 with one or more mechanical fasteners 32, such as nuts and bolts. While an insert portion 26 is mentioned and depicted, the portion 26 may be connected in other ways to the outrigger arm system 10, and insertion into the system 10 is not required.

Figure 3:
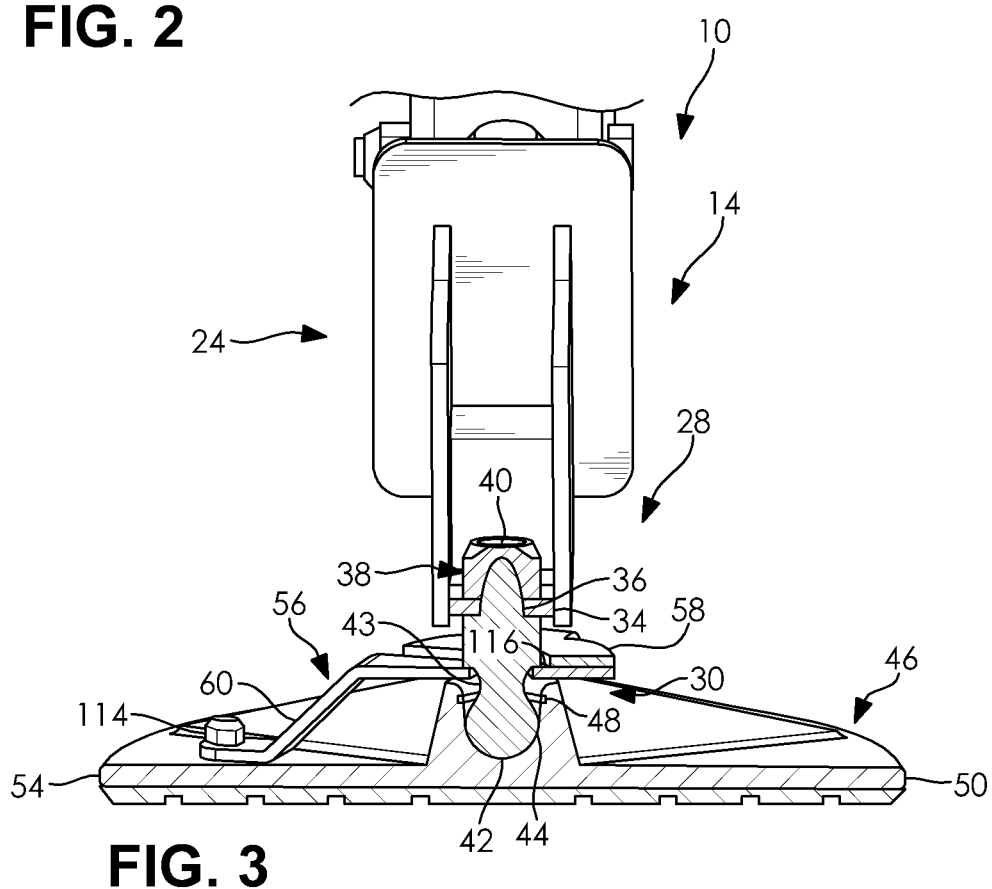
FIG. 3 depicts a cut-away end view of a portion of the system depicted in FIG. 1.

As can be appreciated from FIGS. 2 and 3, the portion 28 supporting the foot support 24 that supports part of the ball joint 30 may have at least one internal support flange 34. The internal support flange 34 may be such as a plate. The internal support flange 34 may have an aperture 36 extending through the flange 34. The aperture 36 may be centered in the flange 34.

One end portion 38 of a ball joint stud 40 may be located in the aperture 36. The internal support flange 34 forming the aperture 36 supports and retains the end portion 38 of the ball joint stud 40 within the aperture 36. The ball joint stud 40 may be fixed and stationary to the support flange 34 or the ball joint stud 40 may be permitted to rotate/turn within the aperture 36 and thus move with respect to the support flange 36. In one embodiment, the ball joint stud 40 may have a cylindrical shape.

The other end portion of the ball joint stud 40, opposite the end portion 38, may be provided with a ball-type member 42. The ball-type member 42 may be unitary, one-piece and integrally formed with the ball joint stud 40.

A neck portion 43 may connect the ball joint stud 40 with the ball-type member 42. The neck portion 43 may have a narrower width compared with the width of the ball joint stud 40 and the ball-type member 42.

The ball-type member 42 may be adapted to be located in a complimentary shaped ball socket 44 associated with a footpad assembly 46. The ball-type member 42 may be vertically secured within the ball socket 44 such as through a clip or ring 48. The clip or ring 48 may at least partially encircle the ball joint stud 40 and capture it to prevent its unintentional removal from the ball socket 44. In one embodiment, the clip 48 may be located at least partially about the neck portion 43. The ball-type member 42 and the ball socket 44 are adapted to move, or pivot, with respect to one another.

In one embodiment, the ball socket 44, and thus the footpad assembly 46, is permitted to move at an angle with respect to the ball-type member 42. The movement may be such as a pivotal and/or rotational type movement of the ball socket 44 and footpad assembly 46 with respect to the ball-type member 42.

The ball socket 44 may be integrally formed, one piece and unitary with a base 50 of the footpad assembly 46. By way of example only, the ball socket 44 may be cast with the footpad base 50. In the depicted embodiment, such as shown in FIG. 3, the ball socket 44 may be centered within the footpad base 50, which may have a generally circular outer perimeter 54. A plurality of ribs 52 may extend from the ball socket 44 radially outward toward the outer perimeter 54 of the footpad base 50. The ribs 52 may taper in height from a maximum adjacent the ball socket 44 to a minimum adjacent the outer perimeter 54.

The footpad assembly 46 may also comprise a spider assembly 56. The spider assembly 56 may be comprised of two parts: an upper unit 58 and a lower unit 60. One embodiment of the spider assembly 56 and the units 58, 60 may be seen in FIGS. 4-7.

The upper unit 58 may be unitary, integrally formed and one piece. Similarly, the lower unit 60 may be unitary, integrally formed and one piece. It is preferred, however, that the upper and lower units 58, 60 are separate, or separable, from one another.

The upper and lower units 58, 60 may be cast or machined or otherwise formed, such as out of metal. Other materials may be used, however, and the upper and lower units 58, 60 can be formed of different materials compared with one another.

The upper unit 58 may be comprised of two legs 62 that support a receiving unit 64. The receiving unit 64 may have a substantially curvilinear outer perimeter 66, but other shapes are permissible. Radially inward from the outer perimeter 66 may be a capture portion 68. The capture portion 68 may have a planar upper surface 70 and a planar lower surface 72 where the two surfaces 70, 72 define between them a substantially constant thickness. The capture portion may also define an aperture 74 that extends from the upper surface 70 to the lower surface 72.

The aperture 74 may be centered within the capture portion 68. The aperture 74 may have a substantially circular perimeter 76 with a radial channel 78 continuously connecting the aperture 74 to the outer perimeter 66. In the depicted embodiment, the radial channel 78 is provided with a width that is at least as wide as a width of the neck 43 of the ball stud 40. Preferably, the radial channel 78 has sides 80 that are straight and parallel one another from the aperture 74 to the outer perimeter 66. In some embodiments, the upper surface 70 of the capture portion 68 may have a chamfered, or angled, surface 82 toward the aperture 74.

Figure 5:
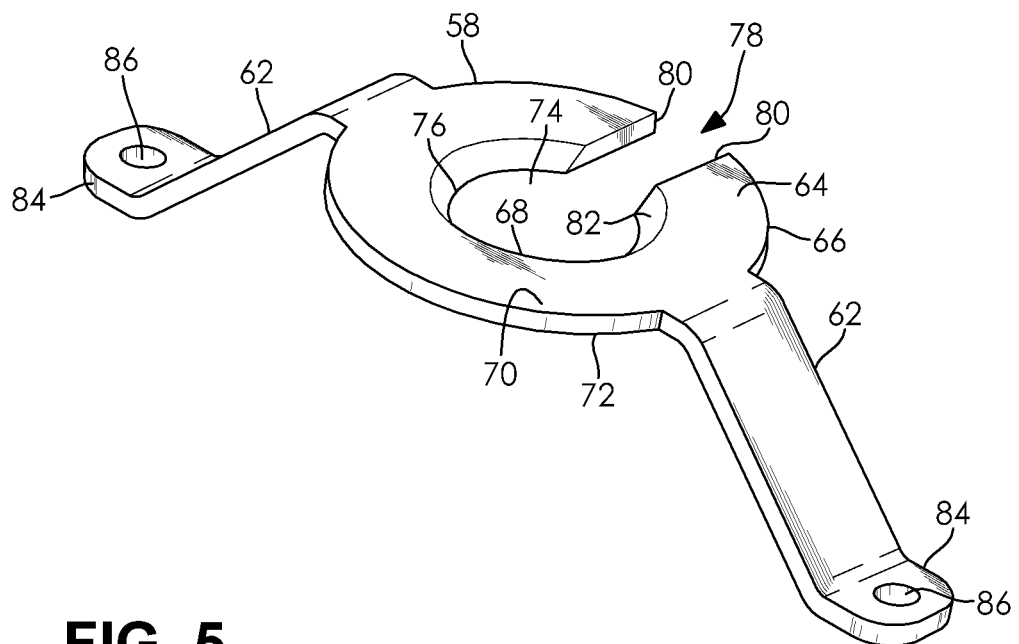
FIG. 5 depicts a top perspective view of a portion of the system depicted in FIG. 1.
Figure 7:
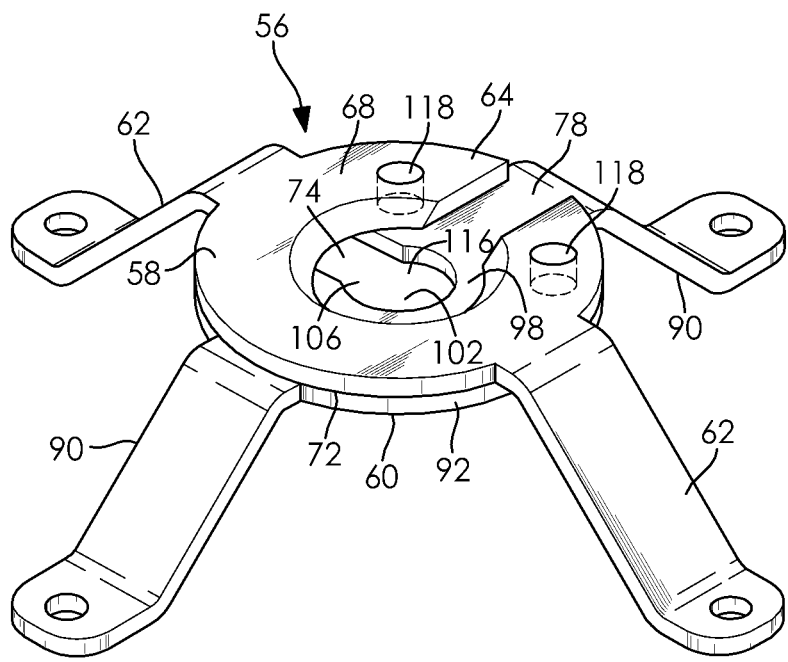
FIG. 7 depicts a top perspective view of components of the system depicted in FIG. 1.

With reference to FIGS. 5 and 7, the legs 62 may extend from the capture portion 68. In the depicted embodiment, the legs 62 extend in opposite directions from one another from the capture portion 68, for example by approximately 180 degrees from one another.

Each leg 62 may extend at the same angle downward and outward from the capture portion 68. Each leg 68 may also terminate in a fastener flange 84, where the fastener flange 84 may be parallel, but not coplanar with the upper and lower surfaces 70, 72 of the capture portion 68. In some embodiments, the fastener flanges 84 may be laterally offset from the capture portion 86.

Each fastener flange 84 may have at least one aperture 86 for receiving a fastener 88, such as a bolt therethrough. Thus, the upper unit 58 may be fixed with respect to the base 50. In the uninstalled condition, the legs 62 may define between them an open, uninterrupted, continuous space located below the planar lower surface 72.

The lower unit 60 may be comprised of two legs 90 that support a receiving unit 92. The receiving unit 92 may have a substantially curvilinear outer perimeter 94, but other shapes are permissible. Radially inward from the outer perimeter 94 may be a capture portion 96. The capture portion 96 may have a planar upper surface 98 and a planar lower surface 100 where the two surfaces 98, 100 define between them a substantially constant thickness. The capture portion 96 may also define an aperture 102 that extends from the upper surface 98 to the lower surface 100.

The aperture 102 may be centered within the capture portion 96. The aperture 102 may have a substantially circular perimeter 104 with a radial channel 106 continuously connecting the aperture 102 to the outer perimeter 94. In the depicted embodiment, the radial channel 106 is provided with a width that is at least as wide as a width of the neck 43 of the ball stud 40. Preferably, the channel 106 has sides 108 that are straight and parallel one another from the aperture 102 to the outer perimeter 94.

Figure 4:
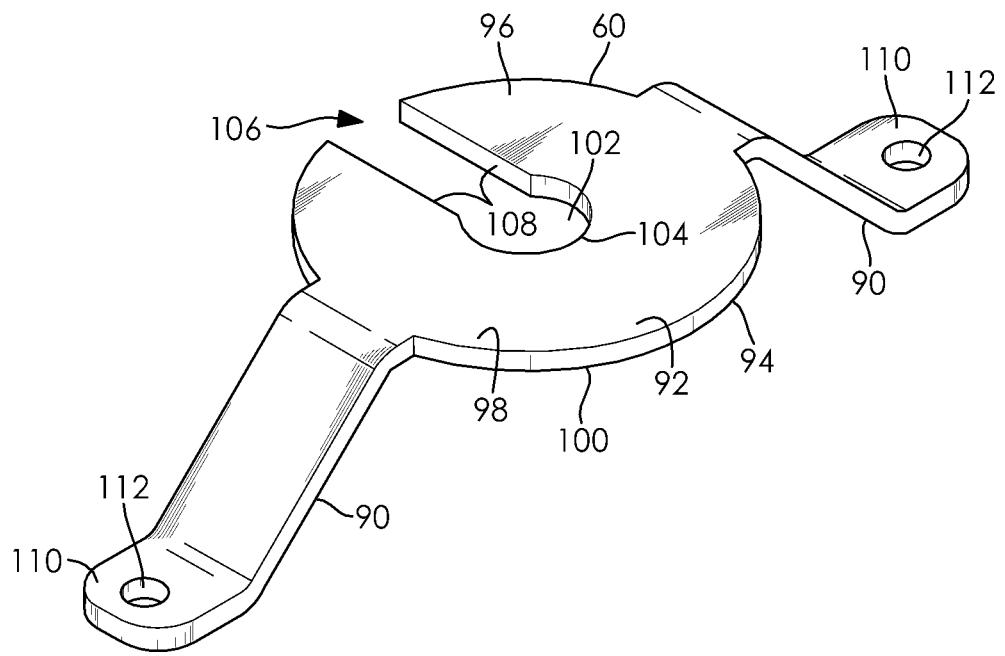
FIG. 4 depicts a top perspective view of a portion of the system depicted in FIG. 1.

With reference to FIGS. 4 and 5, the legs 90 may extend from the capture portion 96. In the depicted embodiment, the legs 90 extends in opposite directions from one another from the capture portion 96, for example by approximately 180 degrees from one another.

Each leg 90 may extend at the same angle downward and outward from the capture portion 96. Each leg 90 may also terminate in a fastener flange 110, where the fastener flange 110 may be parallel, but not coplanar with the upper and lower surfaces 98, 100 of the capture portion 96. In some embodiments, the fastener flange 110 may be laterally offset from the capture portion 96.

Each fastener flange 110 may have at least one aperture 112 for receiving a fastener 114, such as a bolt therethrough. Thus, the lower unit 60 may be fixed with respect to the base 50 and the upper unit 58. The legs 90 may define between them an open uninterrupted, continuous space located below the planar lower surface 100.

While two legs 62, 90 are described and depicted at particular locations with respect to one another, it is also permissible to provide more legs on the upper unit 58 or the lower unit 60. The legs 62, 90 may be positioned at any radial position and at any distance from one another as long as they don't interfere with other parts, the assembly of the outrigger arm system 10 or its operation. In one embodiment, the legs 62, 90 may be positioned approximately 90 degrees from one another when the lower unit 60 is located under the upper unit 58. Additional legs may be needed to provide additional support for certain outrigger arm systems 10.

Figure 6:
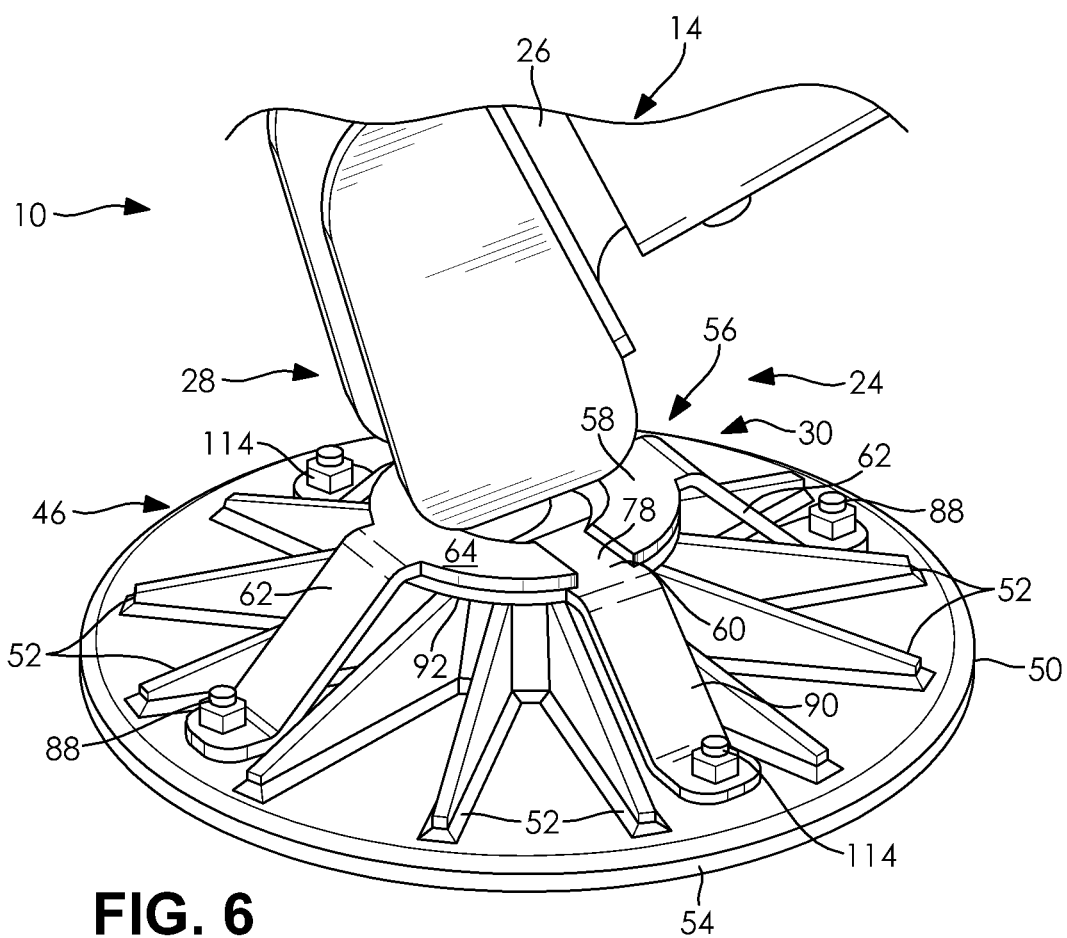
FIG. 6 depicts a top perspective view of components of the system depicted in FIG. 1.

The upper unit 58 is designed to be located at least partially above the lower unit when the units 58, 60 are installed on the footpad assembly 46, as can be appreciated from FIGS. 2, 3 and 6. As shown in FIG. 7, in one embodiment, the lower surface 72 of the capture portion 68 for the upper unit 58 may be in direct contact with the upper surface 98 of the capture portion 96 for the lower unit 60. Thus, the capture portions 68, 98 may be co-located in a first plane and substantially vertically aligned with one another. It can be appreciated that the fastener flanges 84, 110 may be in a second plane below the first plane. The apertures 74, 102 of the capture portions 68, 96 are preferably aligned with one another to provide a continuous, uninterrupted vertically extending channel 116 extending from the upper unit 58 to the lower unit 60.

In the installed condition, the upper and lower units 58, 60 are oriented so that their radial channels 78, 106 are offset from one other. For example, referring to FIGS. 6 and 7, the primary direction of radial channels 78, 106 may be offset from one another by approximately 90 degrees. By offsetting the primary direction of the radial channels 78, 106, when the upper and lower units 58, 60 are stacked on, or nested with, one another, the capture portions 68, 96 of the upper and lower units 58, 60 function to complete, or close, the respective apertures 74, 102 and the radial channels 78, 106 of the upper and lower units 58, 60, which captures the ball joint stud 40, which is located in the vertically extending channel 116 created by the aligned apertures 74, 102. In one embodiment, the capture portions 68, 96 may be located about the neck portion 43 between the ball joint stud 40 and the ball-type member 42. In some embodiments, the above-described arrangement results in the radial channels 78 or 106 of the upper or lower units 58, 60 being aligned with one of the legs of the opposite unit 58 or 60.

In the orientation described above, the spider assembly 56 and thus the footpad assembly 46 are provided with a range of pivot entirely circumferentially about the ball joint stud 40 and the ball-type member 42. This pivoting flexibility enables the footpad assembly 46 to rest firmly and securely on many different types of ground including ground that is not level and/or is at an angle.

The depicted embodiment in the figures further shows that when the upper and lower units 58, 60 are angled in the preferred way with respect to one another in the installed condition, the legs 62, 90 of each unit 58, 60 are spaced from one other by approximately 90 degrees. Since the units 58, 60 are designed to be stacked, the legs 90 of the lower unit 60 may be shorter than the legs 62 of the upper unit 58, which have to be longer to extend over the lower unit 60 to the footpad assembly base 50.

In one embodiment, mechanical fasteners 118, such as bolts, may be located through the upper unit 58 into the lower unit 60 to further secure them together and to base 50, as shown in FIG. 6. By way of example only, one or more mechanical fasteners 118 can be located through the capture portions 68, 96 of the upper and lower units 58, to secure them together and add strength to the footpad assembly 46. The fasteners 118 are schematically shown in FIG. 7.

In the installed condition, such as shown in FIG. 2, the lower surface 72 of the lower unit 60 may be located above the ball socket 44 and spaced from the ball socket 44 by a gap 120. Alternatively, the lower surface 72 of the lower unit 60 may rest on, and be in direct contact with, the ball socket 44.

In accordance with the provisions of the patent statutes, the device and method has been described in what is considered to represent its preferred embodiments. However, it should be noted that the device and method can be practiced otherwise than as specifically illustrated and described without departing from its spirit or scope.

What is claimed is:

1. An outrigger footpad retainer system, comprising:
a spider, comprising:
an upper unit comprised of two legs connected to a first capture portion, and
a lower unit comprised of two legs connected to a second capture portion,
wherein the upper unit at least partially overlaps the lower unit,
wherein a ball stud is located within apertures of said first and second capture portions.

2. The outrigger footpad retainer system of claim 1, wherein said first capture portion and said second capture portion each have planar upper and lower surfaces defining substantially constant thicknesses between the surfaces.

3. The outrigger footpad retainer system of claim 2, wherein said first capture portion and said second capture portion each have an aperture extending from the upper and lower surfaces through the capture portions, wherein said apertures are vertically aligned with one another.

4. The outrigger footpad retainer system of claim 3, wherein said first capture portion and said second capture portion each have a radial channel extending from each aperture to an outer perimeter, wherein each radial channel extends from the upper and lower surfaces through the capture portions.

5. The outrigger footpad retainer system of claim 4, wherein each of said radial channels have a width that is at least as wide as a width of a neck of a ball stud.

6. The outrigger footpad retainer system of claim 4, wherein sides of each of said respective radial channels parallel one another.

7. The outrigger footpad retainer system of claim 4, wherein said radial channels are offset and not aligned with one another so that capture portions of the upper and lower units close the respective apertures.

8. The outrigger footpad retainer system of claim 1, wherein a portion of the first capture portion has a chamfered surface about the aperture.

9. The outrigger footpad retainer system of claim 1, wherein said legs of each of said respective upper and lower units are approximately 180 degrees from one another about the respective capture portions.

10. The outrigger footpad retainer system of claim 9, wherein said legs of each of said respective upper and lower units are angled downwardly from the respective capture portions.

11. The outrigger footpad retainer system of claim 10, wherein said legs of said upper unit and said legs of said lower unit are secured to a footpad base.

12. The outrigger footpad retainer system of claim 1, wherein said capture portion of said lower unit is located below said capture portion of said upper unit.

13. The outrigger footpad retainer system of claim 12, wherein an upper surface of said second capture portion is located directly below a lower surface of said first capture portion.

14. The outrigger footpad retainer system of claim 1, wherein said legs of said upper and lower units are spaced apart from one another about a footpad base by approximately 90 degrees.

15. The outrigger footpad retainer system of claim 1, wherein said upper and lower units are each one piece, integrally formed and unitary of a metallic material.

16. An outrigger footpad retainer system, comprising:
a spider, comprising:
an upper unit comprised of two legs, wherein at least one leg has a fastener flange at one end portion and a capture portion at an opposite end portion, and
a lower unit comprised of two legs, wherein at least one leg has a fastener flange at one end portion and a capture portion at an opposite end portion,
wherein said capture portions are in a first plane and substantially vertically aligned with one another and said fastener flanges are in a second plane below said first plane,
wherein one of said capture portions of an upper or lower unit has a channel aligned with one of said legs of the opposite unit.

17. The outrigger footpad retainer system of claim 16, wherein said fastener flanges of said upper and lower units are laterally offset from said capture portions.

18. An outrigger footpad retainer system, comprising:
a spider, comprising:
an upper unit comprised of two legs connected to a first capture portion, and
a lower unit comprised of two legs connected to a second capture portion,
wherein the upper unit at least partially overlaps the lower unit,
wherein said first capture portion and said second capture portion each have a radial channel extending from respective central apertures to respective outer perimeters of the capture portions.

* * * * *